United States Patent [19]

McGinness et al.

[11] Patent Number: 5,486,290

[45] Date of Patent: Jan. 23, 1996

[54] FLUID FILTER COLLECTOR WITH OPPOSED RIBS

[75] Inventors: Edward A. McGinness, New Philadelphia, Ohio; Gary McHone, Beloit, Wis.

[73] Assignee: Harvard Corporation, Evansville, Wis.

[21] Appl. No.: 396,348

[22] Filed: Feb. 28, 1995

Related U.S. Application Data

[63] Continuation of Ser. No. 862,783, Jan. 9, 1992, abandoned.

[51] Int. Cl.⁶ .......................... B01D 29/54; B01D 35/00
[52] U.S. Cl. .................. 210/323.2; 210/345; 210/440; 210/443; 210/455; 210/494.3
[58] Field of Search .................. 210/437, 455, 210/345, 440, 443, 494.1, 494.3, 323.1, 323.2; 55/498, 500

[56] References Cited

U.S. PATENT DOCUMENTS

| | | |
|---|---|---|
| 2,076,934 | 4/1937 | Burkhalter . |
| 3,504,803 | 4/1970 | Brayman . |
| 3,986,960 | 10/1976 | Wire . |
| 4,366,057 | 12/1982 | Bridges . |
| 4,454,036 | 6/1984 | Suzuki . |
| 4,575,422 | 3/1986 | Zimmer . |
| 4,588,503 | 5/1986 | Sugiura . |
| 4,751,901 | 6/1988 | Moor . |
| 4,773,999 | 9/1988 | Schade . |
| 4,869,820 | 9/1989 | Yee . |
| 5,080,791 | 1/1992 | Sims . |
| 5,178,753 | 1/1993 | Trabold . |
| 5,232,588 | 8/1993 | Gryden . |
| 5,247,876 | 9/1993 | Wilson . |
| 5,271,850 | 12/1993 | Stutzman . |

FOREIGN PATENT DOCUMENTS

| | | |
|---|---|---|
| 534420 | 12/1956 | Canada . |
| 47-13219 | 8/1969 | Japan . |
| 47-1744 | 9/1969 | Japan . |
| 2220866 | 8/1969 | United Kingdom . |
| 88/05335 | 7/1988 | WIPO . |
| 89/06567 | 7/1989 | WIPO . |

*Primary Examiner*—Thomas M. Lithgow
*Attorney, Agent, or Firm*—Santangelo Law Offices

[57] ABSTRACT

In an axial flow fluid filter having two filter elements formed of layers of tissue wound around a central core, a fluid collector is positioned between two filter elements and has a central annulus which surrounds an axial flow path. The central annulus has a top surface perpendicular to the flow path. A rim annulus and a plurality of annular ribs have top surfaces coplanar with the central annulus which engage with an upper filter element. A plurality of radial ribs extend axially from the annular ribs and engage with a lower filter element. The annular ribs define axial fluid flow passages and the radial ribs define radial flow passages which direct filtered fluid into the central flow path. The fluid collector is formed as a unitary plastic injection-molded part which rigidly spaces apart two filter elements and which directs fluid flow to the outlet port of the fluid filter with minimal flow obstruction.

9 Claims, 5 Drawing Sheets

FLUID FILTER COLLECTOR WITH OPPOSED RIBS

This is a continuation of application Ser. No. 07/862,783 filed Jan. 9, 1992 and now abandoned.

FIELD OF THE INVENTION

The present invention relates to fluid filtering apparatus in general and to fluid filter collectors in particular.

BACKGROUND OF THE INVENTION

Modern vehicles and industrial machinery rely on a number of recirculating fluids for effective operation. Oil for engine cooling, hydraulic oil, transmission fluids, lube oils and others are circulated through complex apparatus often with close tolerances. Machinery which relies on pumps, gears, servo-valves and other close-tolerance components is particularly sensitive to small particulate contamination in its service fluids. Effective filtration of these fluids can extend the effective life of apparatus and maintain operation at high levels of performance. Furthermore, to the extent fluids can be maintained free of contamination, the life of the fluid itself is extended saving costs due to fluid replacement and machinery down time. Another vital consideration is that many industrial fluids are difficult and costly to dispose of. To the extent old fluid can be cleaned the environmental problems of fluid waste disposal may be minimized.

One particularly effective type of fluid filter causes fluids to flow interstitially between layers of wound fibrous tissue. The fibrous tissue is typically wound on rolls of a particular depth. To minimize the resistance of the tissue for a given amount of tissue surface area, it is often desirable to provide a plurality of stacked tissue rolls. To ensure fluid flow exclusively through the tissue rolls, these filters are preferably provided with fluid collectors with peripheral flanges which engage with the tissue of an upper and lower tissue roll filter element to prevent the entrance of unfiltered fluid between the distinct rolls into the fluid collector—a problem known as channeling. Such a filter apparatus is disclosed in U.S. Pat. No. 4,017,400 to Schade, the disclosure of which is incorporated by reference herein.

A fluid collector serves to separate the fibrous tissue rolls from one another or from an adjacent surface and to at the same time provide unhindered passage for filtered fluid to leave the filter elements. Fluid collectors are known which are formed of injection molded plastic which have a plurality of alternating radial slots and ridges with the ridges serving to space the fibrous tissue roll elements from the collector and the slots serving to direct the filtered fluid into a central flow tube.

Because of the high pressures exerted on the fluid collector by the pressurized fluid and the filter elements, each filter collector must be sufficiently rigid to withstand these pressures. However, it is also highly desirable that the fluid collector present as little resistance as possible to the free flow of fluid. The less the total resistance to flow of the oil filter, including the collector, the greater the rate of fluid filtration allowable for a given fluid pressure.

What is needed is a fluid collector which rigidly spaces filter elements and yet which presents a minimal restriction to fluid flow.

SUMMARY OF THE INVENTION

The fluid collector of the present invention is for use within pressurized axial flow fluid filters of the type having a container with an inlet port and an outlet port, a centrally located flow path having at least one fluid receiving port for receiving filtered fluid which is to be transported outside of the container outlet port, and, in one embodiment, having at least two filter elements with wound layers of tissue which encircle the centrally located flow path. The first filter element is disposed above the collector, the second filter element below the collector, and both within the container. The fluid collector is a unitary plastic article having a central annulus which surrounds the flow path and which has a top surface which is adapted to engage against an upper filter element, the top surfaces extending substantially perpendicular to the central flow path. The collector has a plurality of concentric annular ribs that are coaxial with the central annulus and which have top surfaces which are substantially coplanar with the top surface of the central annulus. A plurality of radial ribs extend between the central annulus and the annular ribs and extend axially beneath the rim annulus and annular ribs. The radial ribs have a bottom surface which is substantially parallel to and beneath the top surface of the annular ribs. The radial rib bottom surfaces are adapted to engage against the lower filter element positioned beneath the first filter element. The radial ribs define a plurality of radial flow passages between the first and second filter elements which direct fluid from the filter elements to the central flow path. The annular ribs define a plurality of axial flow passages which direct fluid into the radial flow passages. The fluid collector spaces the first element from the second element while at the same time providing limited interference with the free flow of filtered fluid through the filter elements and outside of the filter container.

It is an object of the present invention to provide a fluid collector for an axial flow fluid filter with low resistance to fluid flow.

It is another object of the present invention to provide a fluid collector which effectively spaces two wound tissue filter elements from one another.

It is also an object of the present invention to provide a fluid collector providing multiple unobstructed passages for fluid flow to a central filter fluid flow path.

It is an additional object of the present invention to provide an axial flow fluid filter with an improved fluid collector to facilitate fluid flow through the filter.

Further objects, features and advantages of the invention will be apparent from the following detailed description when taken in conjunction with the accompanying drawings.

DESCRIPTION OF THE PREFERRED EMBODIMENT

Figure 1:
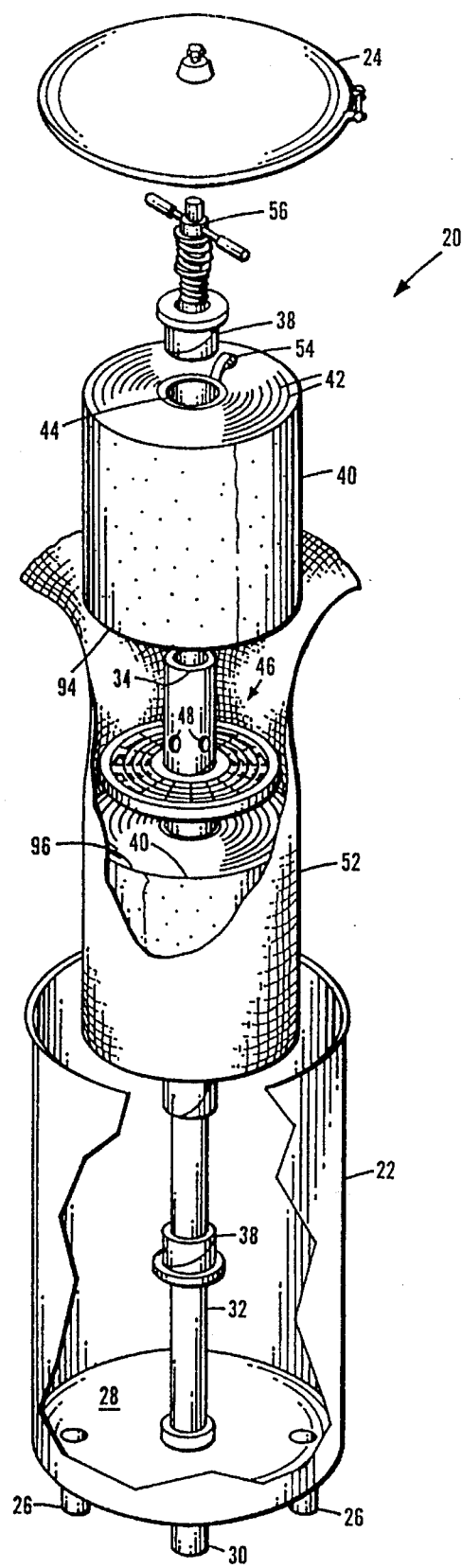
FIG. 1 is an exploded isometric view of an axial flow fluid filter utilizing the fluid collector of the present invention.

Referring more particularly to FIGS. 1–7, wherein like numbers refer to similar parts, an axial flow fluid filter 20 is shown in FIG. 1. The filter 20 will typically be employed as a bypass filter, filtering at any time only a fraction of the total fluid flowing in the system. The fluid filter 20 has a metal cylindrical filter container 22 which is covered with a circular top 24 which is engagable in a liquid tight seal with the container 22. Two fluid inlet ports 26 are located in the bottom 28 of the container 22. The inlet ports 26 are adapted to be connected with the recirculating fluid which is to be filtered. An outlet port 30 is located in the center of the bottom 28 and is adapted to be connected to return the filtered fluid to the apparatus in which it will be employed. A cylindrical exit tube 32 extends within the container 22 from the outlet port 30. A paperboard central shaft 34 surrounds the exit tube 32 so as to define a central flow path 36 for fluid between the central shaft 34 and the exit tube 32.

Figure 5:
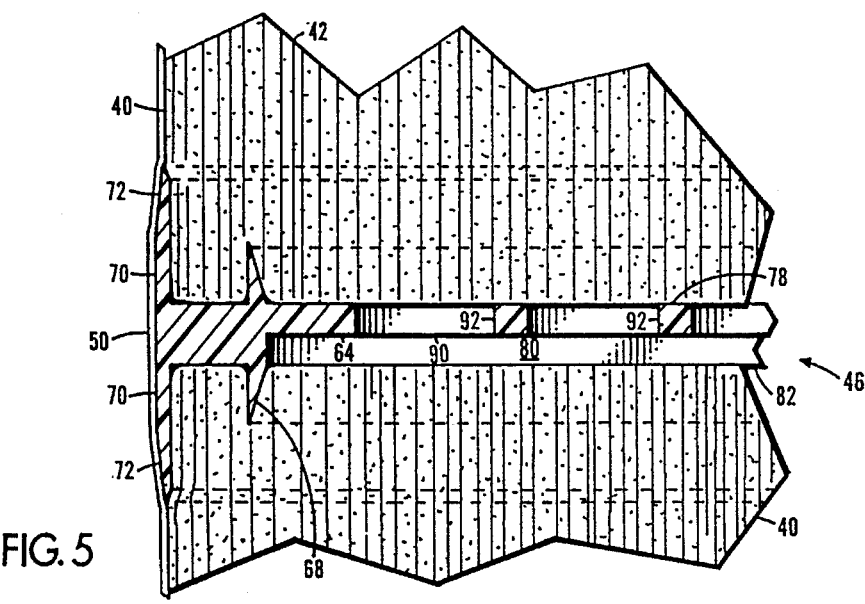
FIG. 5 is an enlarged fragmentary cross-sectional view of the fluid collector of FIG. 2 shown engaged with two opposed filter elements.
Figure 7:
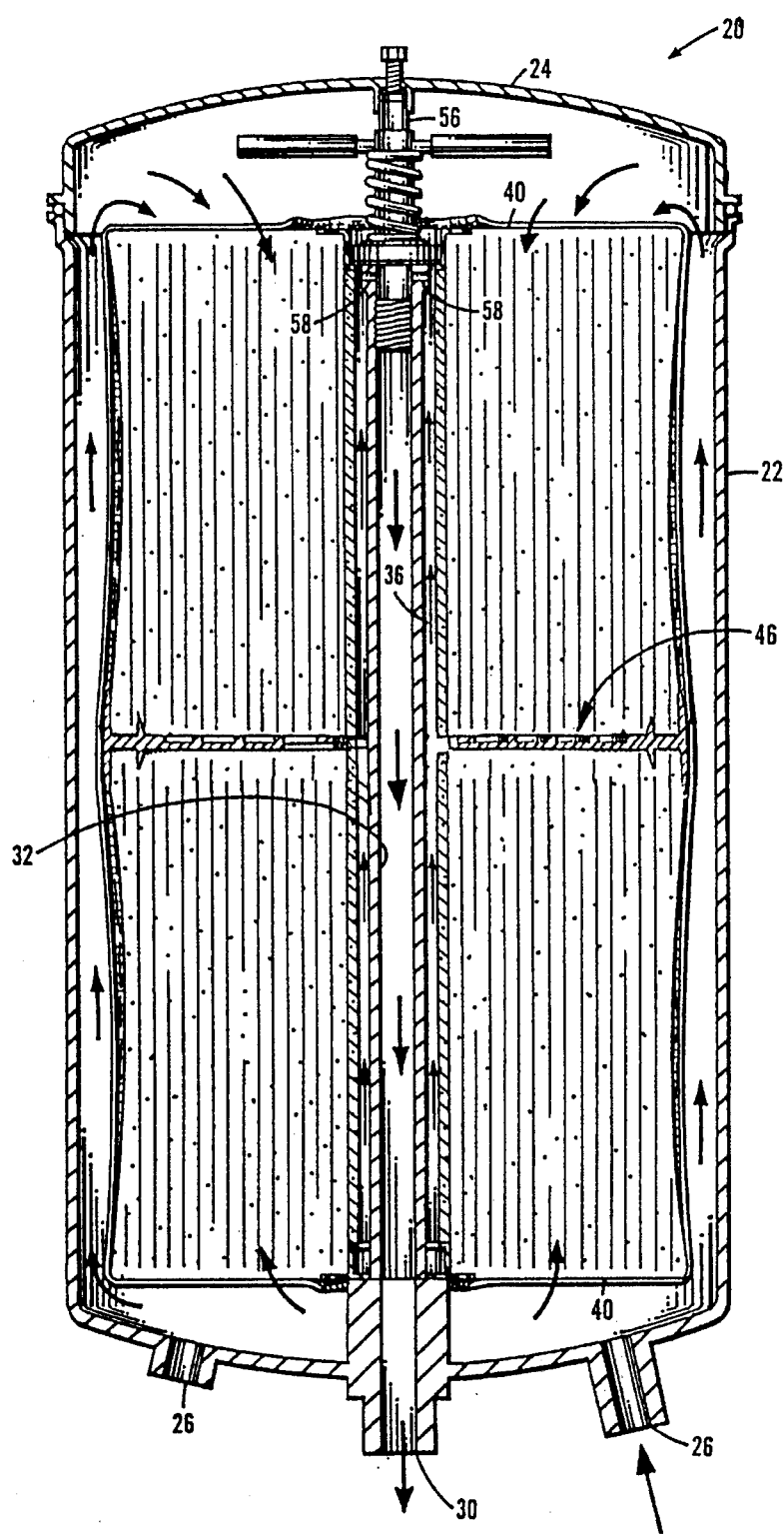
FIG. 7 is a cross-sectional view of the filter of FIG. 1 schematically illustrating the fluid flow path.

Cylindrical filter retainers 38 are located above and below the central shaft 34. Two filter elements 40 are mounted on the central shaft 34. Each filter element 40 is formed from layers of fibrous tissue 42 wound around a cylindrical cardboard inner core 44. A fluid collector 46 is mounted on the central shaft 34 between the two filter elements 40. Receiving ports 48 are located in the central shaft 34 at a position to be aligned with the fluid collector 46. A plastic membrane 50, shown in FIG. 5, is wrapped around the periphery of the filter element 40 and fluid collector 46 assembly. A porous fabric sock 52 surrounds the filter elements 40 and is engaged between the upper retainer 38 and the upper filter element 40. A pull loop 54 is engaged with the sock to assist in removing the filter elements from the container 22. A spring-loaded T-bolt 56 is threadedly engaged with the exit tube 32 and has an exit opening or port 58 for receiving fluid from the collector and directing that fluid from the central flow path 36 to the interior of the exit tube 32 and hence to the outlet port 30. As shown in FIG. 7 by arrows, fluid to be filtered enters through one or both inlet ports 26, where it may enter the filter elements 40 and travel interstitially between the tissue 42 layers to reach the fluid collector 46, where it is directed to the central flow path 36 and hence to the outlet port 30.

Figure 2:
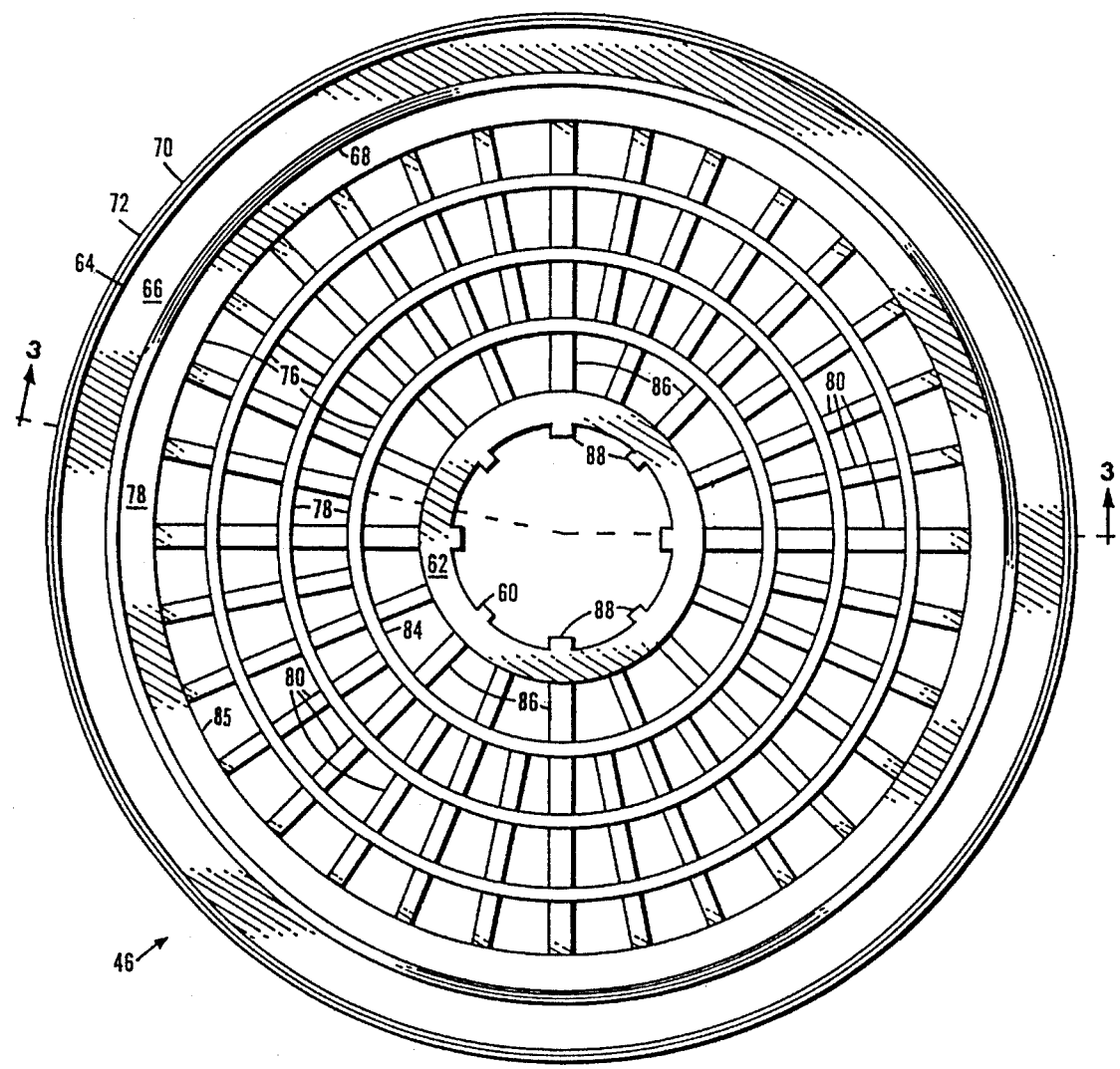
FIG. 2 is a top plan view of the fluid collector of FIG. 1.

The fluid collector 46 is preferably formed as a unitary plastic injection molding. As shown in FIG. 2, the fluid collector 46 has a central annulus 60 with an inner diameter in an exemplary embodiment of 1.75 inches. The central annulus 60 has a planar top surface 62 which is substantially perpendicular to the central flow path 36. A rim annulus 64 having approximately twice the thickness of the central annulus 60 surrounds the central annulus and is coaxial with it. The rim annulus 64 also has a top surface 66 which is substantially coplanar with the central annulus top surface 62.

To prevent the channeling of unfiltered fluid between the filter elements 40, two sets of flanges 68, 70 extend axially above and below the rim annulus 64. As best shown in FIG. 5, the inner flanges 68 extend into the filter elements 40 interstitially between layers of tissue 42. The outer flanges 70 engage with the outer periphery of the filter elements 40. The outer flanges 70 have chamfered upper and lower surfaces 72 which allow a tight fit between the plastic membrane 50, the outer flanges 70, and the filter elements 40.

The rim annulus 64 has a bottom surface 74 which is substantially parallel to the rim annulus top surface 66 and which is substantially perpendicular to the central flow path 36.

Figure 3:
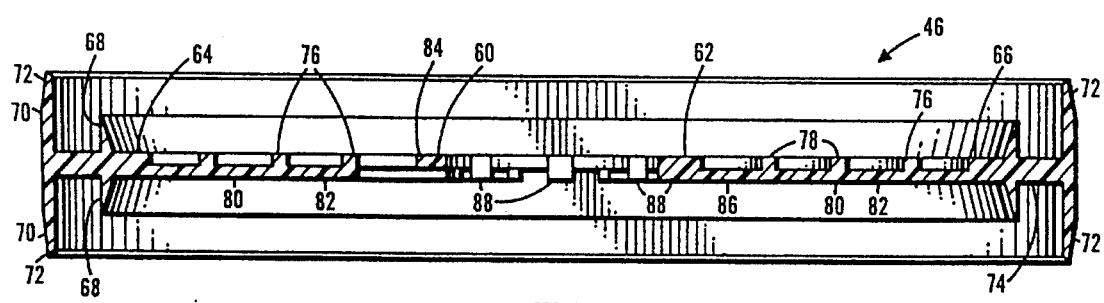
FIG. 3 is a cross-sectional view of the fluid collector of FIG. 2 taken along section line 3—3.

As shown in FIGS. 2 and 3, a plurality of concentric annular ribs 76 are positioned coaxially between the central annulus 60 and the rim annulus 64. The fourth annular rib 85 extends radially inwardly from the inner flange 68. The rim annulus 64 extends between the outer flange 70 and the inner flange 68. Although four annular ribs 76 are shown in the fluid collector 46, a greater or lesser number of ribs may be employed depending on the dimensions of the collector. Each annular rib 76 has a top surface 78 which is substantially coplanar with the top surface 62 of the central annulus 60 and the top surface 66 of the rim annulus 64.

Figure 4:
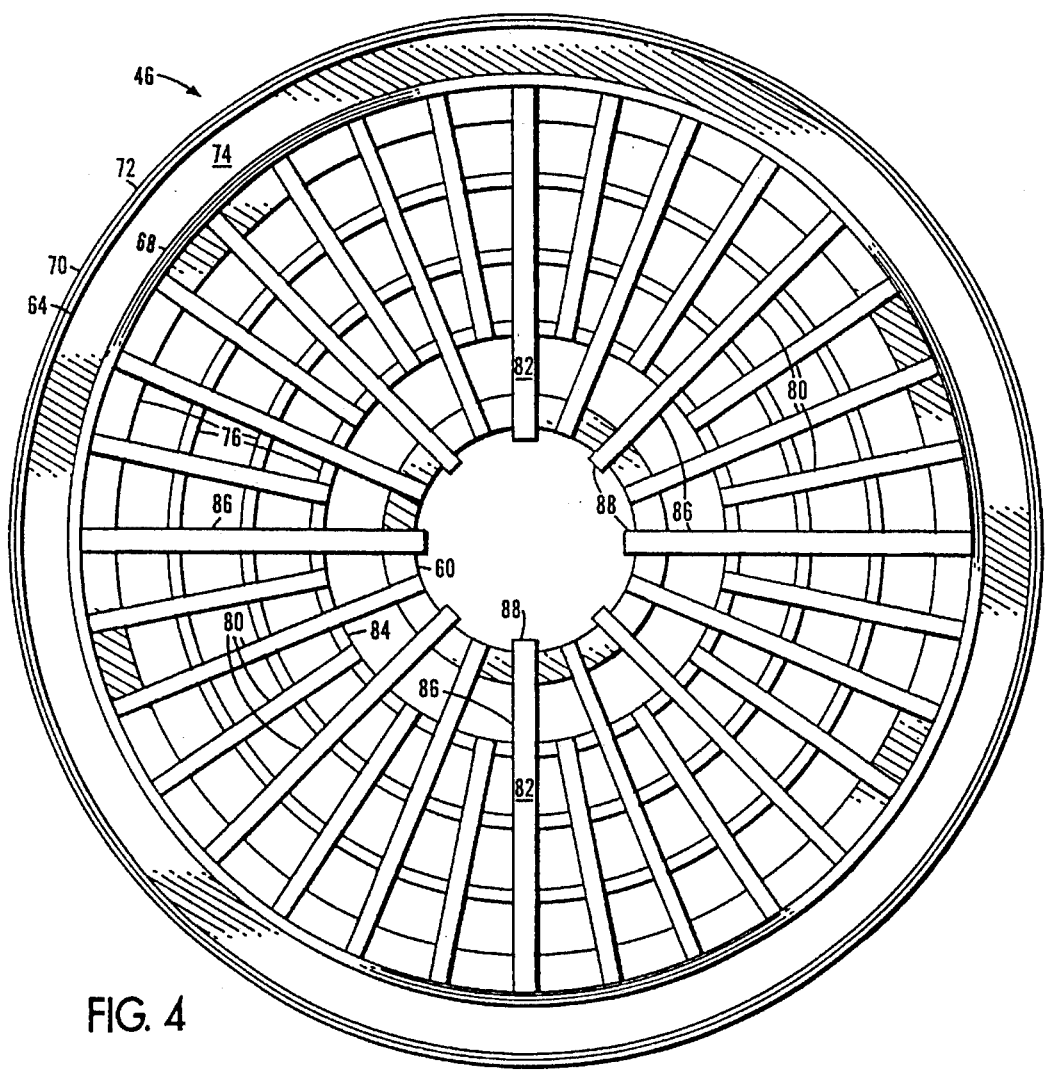
FIG. 4 is a bottom plan view of the fluid collector of FIG. 2.

As shown in FIG. 4, thirty-two radial ribs 80 extend axially beneath the annular ribs 76. Each radial rib 80 has a bottom surface 82 which is substantially coplanar with the bottom surface 74 of the rim annulus 64.

Shorter radial ribs 80 extend from the inner flange 68 adjacent the rim annulus 64 to the first annular rib 84. Interspersed between the shorter ribs are longer radial ribs 80 which extend from a position beneath the inner flange 68 through the central annulus 60. Six major radial ribs 86 extend from the inner flange 68 beneath the central annulus 60 and have portions 88 which extend radially inwardly from the central annulus 60. These inward extensions 88 serve to align the collector 46 with the central shaft 34.

As shown in FIG. 5, the radial ribs 80 define radial flow passages 90, directing fluid to the central flow path of the filter. The annular ribs 76 together with the rim annulus 64 and central annulus 60 define axial flow passages 92, directing fluid downwardly into the radial flow passages 90.

The top surfaces 78 of the annular ribs 76 and the top surfaces 62, 66 of the central annulus 60 and the rim annulus 64 engage with the exit end 94 of the upper filter element 40. These top surfaces 62, 66, 78 support the filter element 40 and resist the fluid pressure which tends to push the tissue 42 of the upper filter element 40 into contact with the lower filter element 40. However, it is important to note that when the top surfaces of the annular ribs 76 and the central annulus 60 and rim annulus 64 are engaged with the filter element 40, transverse fluid flow above the top surface of the collector 46 is blocked, thus allowing only axial flow along the axial flow passages 92.

The bottom surfaces 82 of the radial ribs 80 together with the bottom surface 74 of the rim annulus 64 engage with the exit end 96 of the lower filter element 40. The radial and annular ribs 80, 76 are formed as a unitary object; hence the two sets of ribs are joined to each other to form a rigid framework which effectively spaces apart the two filter elements 40. As shown in FIGS. 3 and 5, because the bottom surfaces 82 of the radial ribs 80 are engaged against the filter element 40, circumferential fluid flow is prevented, and fluid may only flow radially along the radial flow passages 90.

Figure 6:
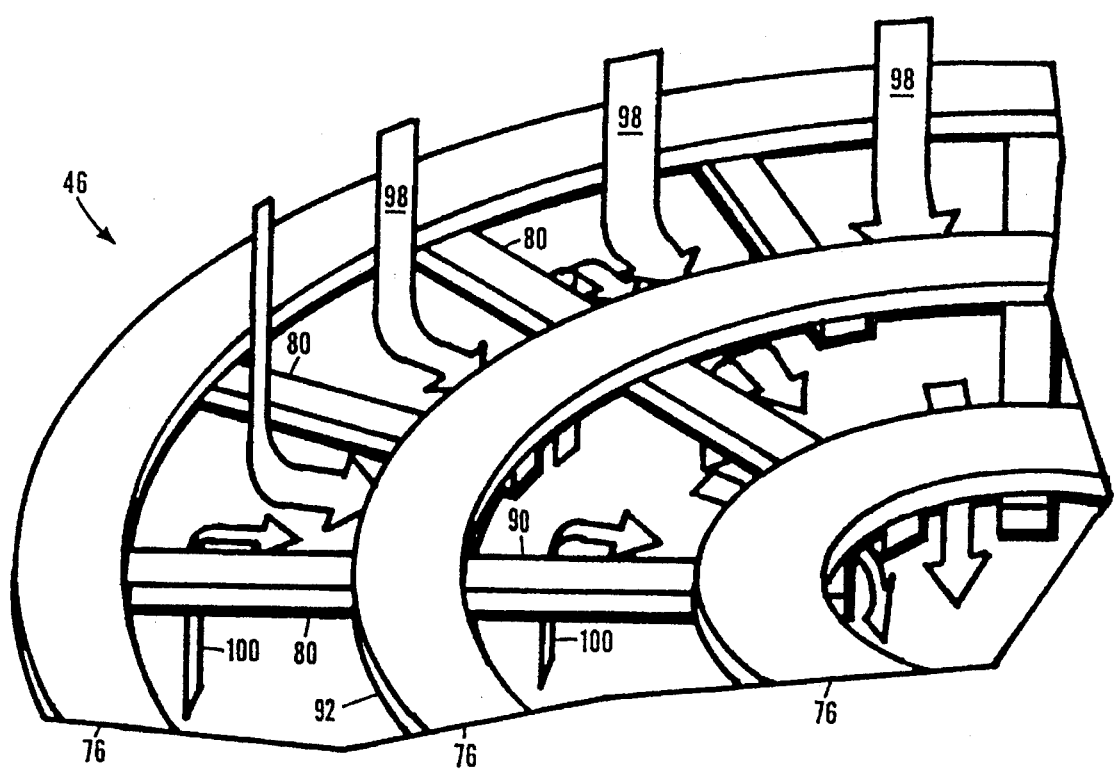
FIG. 6 is a fragmentary schematic view of a portion of the fluid collector of FIG. 2 with arrows indicating the flow path of fluid.

As shown in the idealized schematic view of FIG. 6, the two sets of ribs cooperate to effectively direct fluid flowing downwardly 98 from the upper filter element and fluid flowing upwardly 100 from the lower filter element strictly into the central shaft 34 and the central flow path 36 which exits only into the exit tube 32. It will be noted that the support and channeling functions of the ribs are achieved with a minimal blockage of the tissue 42 of both filter elements. Thus, while the annular ribs 76 obstruct flow through the upper filter element 40, they do not obstruct flow through the lower filter element. In a similar manner, the radial ribs 80 obstruct a certain amount of flow from the lower filter element 40 while leaving the upper filter element 40 unobstructed. The minimization of flow obstruction facilitates fluid flow through the filter 20 and hence greater throughput.

The fluid filter 20 may be utilized to filter oil, lubricating fluids, hydraulic fluids, cutting oils, and other recirculating fluids.

The improved fluid filter collector 46 may be formed in a number of standard dimensions to permit easy substitution in conventionally employed axial flow filters.

It should be noted that although two filter elements with a single fluid collector have been shown, four or more filter elements might also be employed with a plurality of fluid collectors and a flow channeling insert between the filter element pairs. Furthermore, a single filter element supported above the bottom surface of the container by a collector may also be employed.

It is understood that the present invention is not limited to the particular embodiments disclosed and illustrated herein, but embraces all such modified forms thereof as come within the scope of the following claims.

I claim:

1. A pressurized axial flow fluid filter having a liquid tight container with at least one inlet port and outlet port, and a plurality of filter elements having wound layers of tissue, said filter elements having a generally cylindrical shape and an inner core defining flow path extending from the filter elements to the outlet port, and a fluid collector located between and engaging the two filter elements, the fluid collector comprising:

a) an annulus arranged perpendicular to the flow path and which has a top surface which is engaged against a first filter element, the top surface extending substantially perpendicular to the flow path;

b) a plurality of concentric annular ribs coaxial with the annulus and having a top surface substantially coplaner with the top surface of the annulus, the outer annular rib having a rim annulus;

c) a plurality of radial ribs which extend between the annulus and the annular ribs, wherein the radial ribs extend axially beneath the rim annulus and annular ribs, and wherein the radial ribs have a bottom surface substantially parallel to and beneath the top surface of the annular ribs, the radial rib bottom surfaces engaged against an axial end of a second filter element having wound layers of tissue beneath the first filter element, wherein the radial ribs define a plurality of radial flow passages between the first and second filter elements which direct fluid from the filter elements to the flow path and the annular ribs define a plurality of axial flow passages which direct fluid into the radial flow passages.

2. The apparatus of claim 1 further comprising portions of a plurality of radial rids which extend radially inwardly from the fluid collector annulus, the inwardly extending portions engaged against a central tube to center the collector with respect to the flow path.

3. The apparatus of claim 1 further comprising flanges which extend axially from the fluid collector rim annulus, the flanges engaged interstitially between layers of tissue within the first and second filter elements to prevent leakage into the collector from outside the elements.

4. The apparatus of claim 1 further comprising an outer annular flange which extends axially outwardly from the rim annulus of the collector and which engages peripherally with the filter elements to restrict flow into the collector from outside the filter elements in proximity to the collector.

5. The apparatus of claim 1 wherein a first annular rib is located intermediate between the fluid collector rim annulus and the annulus, and further comprising a plurality of shorter radial ribs which extend from the annular rim to the first rib.

6. A pressurized axial flow fluid filter comprising:

a) a container with an inlet port and an outlet port;

b) at least two filter elements each filter element having axial ends and having wound layers of tissue which encircle and define a flow path within said container; and c) a unitary plastic fluid collector engaging the first and second filter elements at an axial end of each, the fluid collector having a plurality of concentric annular ribs having top surfaces which engage against the first filter element and which are coaxial with the flow path and a plurality of radial ribs extending axially from the annular ribs and having bottom surfaces which engage against the second filter element, wherein the annular ribs define a plurality of axially directed flow passages with join a plurality of radial flow passages defined by the radial ribs, and wherein the radial flow passages direct fluid flow from the first and second filter elements to the flow path.

7. The fluid filter of claim 6 further comprising a tube which defines the flow path, and portions of a plurality of radial ribs extend radially inwardly from the fluid collector annulus, wherein the inwardly extending portions engage against the tube to center the collector with respect to the flow path.

8. The fluid filter of claim 6 further comprising flanges which extend axially from the rim annulus, wherein the flanges engage interstitially between layers of tissue within the filter elements to prevent leakage into the collector from outside the element.

9. The fluid filter of claim 6 further comprising an outer annular flange which extends axially outwardly from the rim annulus of the collector and which engages peripherally with the filter elements to restrict peripheral flow into the collector.

* * * * *